(12) United States Patent
Salisbury

(10) Patent No.: US 11,146,837 B2
(45) Date of Patent: Oct. 12, 2021

(54) AUDIENCE LOCATION FOR MEDIA PROGRAMS IN LIVE LINEAR PROGRAMMING

(71) Applicant: HULU, LLC, Santa Monica, CA (US)

(72) Inventor: Mckay Salisbury, Culver City, CA (US)

(73) Assignee: HULU, LLC, Santa Monica, CA (US)

( * ) Notice: Subject to any disclaimer, the term of this patent is extended or adjusted under 35 U.S.C. 154(b) by 0 days.

(21) Appl. No.: 15/836,711

(22) Filed: Dec. 8, 2017

(65) Prior Publication Data

US 2019/0182521 A1 Jun. 13, 2019

(51) Int. Cl.
*H04N 21/254* (2011.01)
*H04N 21/45* (2011.01)
*H04N 21/262* (2011.01)
*H04N 21/2187* (2011.01)
*H04N 21/442* (2011.01)
*H04N 21/488* (2011.01)
(Continued)

(52) U.S. Cl.
CPC ..... *H04N 21/2541* (2013.01); *H04N 21/2187* (2013.01); *H04N 21/25891* (2013.01); *H04N 21/26283* (2013.01); *H04N 21/44213* (2013.01); *H04N 21/4532* (2013.01); *H04N 21/4627* (2013.01); *H04N 21/4668* (2013.01); *H04N 21/4882* (2013.01); *H04N 21/812* (2013.01); *H04N 21/8543* (2013.01)

(58) Field of Classification Search
CPC .................. H04N 21/2541; H04N 21/2187
See application file for complete search history.

(56) References Cited

U.S. PATENT DOCUMENTS 7,320,140 B1 * 1/2008 Boyer ................ H04N 21/2541
375/E7.009
9,483,590 B2 11/2016 Kishore et al.
(Continued)

OTHER PUBLICATIONS

SCTE Standard, SCTE 224 2015, Event Scheduling and Notification Interface; Society of Cable Telecommunications Engineers; Engineering Committee; Digital Video Subcommittee; 2015; 49 pages.
(Continued)

*Primary Examiner* — Brian T Pendleton
*Assistant Examiner* — Frank Johnson
(74) *Attorney, Agent, or Firm* — Fountainhead Law Group P.C.

(57) ABSTRACT

Viewing policies are received for a media program being offered via linear programming. The viewing policies are transformed to a linear prioritized list of audiences and respective actions to perform on a per user basis for presentation via the live linear programming. The actions analyzed to determine a base action associated with sending a base content stream for the media program. An audience associated with the base content stream and previous audiences associated with previous actions that have a higher priority in the linear prioritized list than the content stream audience are selected. An audience definition for the media program is generated defining restrictions based on the base audience and the previous audiences. The audience definition is used to determine whether users may view the media program based on characteristics of the users before the media program is available via the live linear programming.

20 Claims, 10 Drawing Sheets

| Audience | Action | |
|---|---|---|
| Near Location X on a Phone | Slate | 426-1 |
| Near Location X | Recommend Alternative Content Stream | 426-2 |
| In Southern California | Send Content Stream Y | 426-3 |
| In the United States | Blackout | 426-4 |

(51) Int. Cl.
*H04N 21/466* (2011.01)
*H04N 21/258* (2011.01)
*H04N 21/8543* (2011.01)
*H04N 21/4627* (2011.01)
*H04N 21/81* (2011.01)

(56) References Cited

U.S. PATENT DOCUMENTS

| | | | | |
|---|---|---|---|---|
| 2003/0163726 A1* | 8/2003 | Kidd | ................ | H04N 21/2541 726/6 |
| 2005/0060746 A1* | 3/2005 | Kim | ................ | H04N 5/44543 725/46 |
| 2007/0061840 A1* | 3/2007 | Walter | ................ | H04N 5/50 725/39 |
| 2008/0066095 A1* | 3/2008 | Reinoso | ................ | H04N 21/4405 725/28 |
| 2008/0163304 A1* | 7/2008 | Ellis | ................ | H04N 5/44543 725/50 |
| 2008/0301818 A1* | 12/2008 | Sedlmeyer | ................ | H04N 21/2541 726/27 |
| 2010/0058402 A1* | 3/2010 | Hasek | ................ | H04N 7/17318 725/93 |
| 2010/0125867 A1* | 5/2010 | Sofos | ................ | H04N 21/26609 725/28 |
| 2011/0041147 A1* | 2/2011 | Piepenbrink | ................ | H04N 7/17336 725/28 |
| 2011/0119591 A1 | 5/2011 | Veeraraghavan et al. | | |
| 2011/0321088 A1* | 12/2011 | Jacobs | ................ | H04N 21/2402 725/35 |
| 2012/0079527 A1 | 3/2012 | Trimper et al. | | |
| 2012/0079529 A1 | 3/2012 | Harris et al. | | |
| 2012/0198042 A1* | 8/2012 | Dunbar | ................ | H04N 21/2181 709/223 |
| 2013/0260796 A1* | 10/2013 | Hasek | ................ | H04L 67/32 455/456.3 |
| 2013/0326577 A1 | 12/2013 | Bahnck | | |
| 2014/0258732 A1* | 9/2014 | Roth | ................ | G06F 21/6218 713/189 |
| 2016/0048595 A1* | 2/2016 | VanBlon | ................ | G06F 16/9535 707/722 |
| 2016/0360245 A1 | 12/2016 | Sanghavi et al. | | |
| 2016/0373794 A1* | 12/2016 | Heitlinger | ................ | H04N 21/25883 |
| 2017/0094334 A1* | 3/2017 | Le-Chau | ................ | H04N 21/262 |
| 2017/0105032 A1* | 4/2017 | Davis | ................ | H04N 21/2541 |

OTHER PUBLICATIONS

International Search Report and Written Opinion for International Appln. No. PCT/US2018/064282 dated Mar. 25, 2019, 12 pages.
Extended European Search Report Issued in European Patent Application No. 1888673.1, dated Jul. 14, 2021, 3 Pages.
Canadian Examination Report issued in Canadian Patent Application No. 3,083,781. dated Jul. 28, 2021, 8 pages.

* cited by examiner

AUDIENCE LOCATION FOR MEDIA PROGRAMS IN LIVE LINEAR PROGRAMMING

BACKGROUND

The Society of Cable Telecommunications Engineers (SCTE) 224 standard defines an event scheduling and notification interface (ESNI) to facilitate the transmission of event and policy information. The ESNI allows providers to communicate upcoming scheduled or signal-based events and corresponding policy to distributors of the content. For example, the events may be the start of media programs in a live linear television schedule and the policies control who can view the media programs. The distributors can enforce the policies to control the audiences in which the media programs are distributed based on attributes of respective audiences including, but not limited to, geographic location and device type. For example, the SCTE-224 standard can be used to communicate details regarding regional blackout/ alternative content selection or device-type content restrictions for defined audiences.

The distributor can parse the data received through the ENSI into a set of rules that can be applied on a per user basis. For example, when a user tries to watch a channel, the distributor may determine characteristics for the user and apply the characteristics to the rules. Depending on which rules apply, the distributor may perform the corresponding actions. For example, if a user is within a blackout area, then the distributor may display a slate, which is a static image that provides a message to the user and is not a content stream for a media program. The distributor may apply the rules on a per user basis, such as at the user premises. For example, the rules may be applied on customer premise equipment (CPE) at the user premises when a user attempts to watch a television channel. The application of the rules on a per user basis does not cause a significant increase in bandwidth because the rules are applied at the user premises. However, the rules can only be applied when the user attempts to perform an action for a specific media program. For example, the user can tune to a channel that is scheduled to play a media program. The CPE can then apply the rules for the media program to determine which action to take.

DETAILED DESCRIPTION

Figure 1:
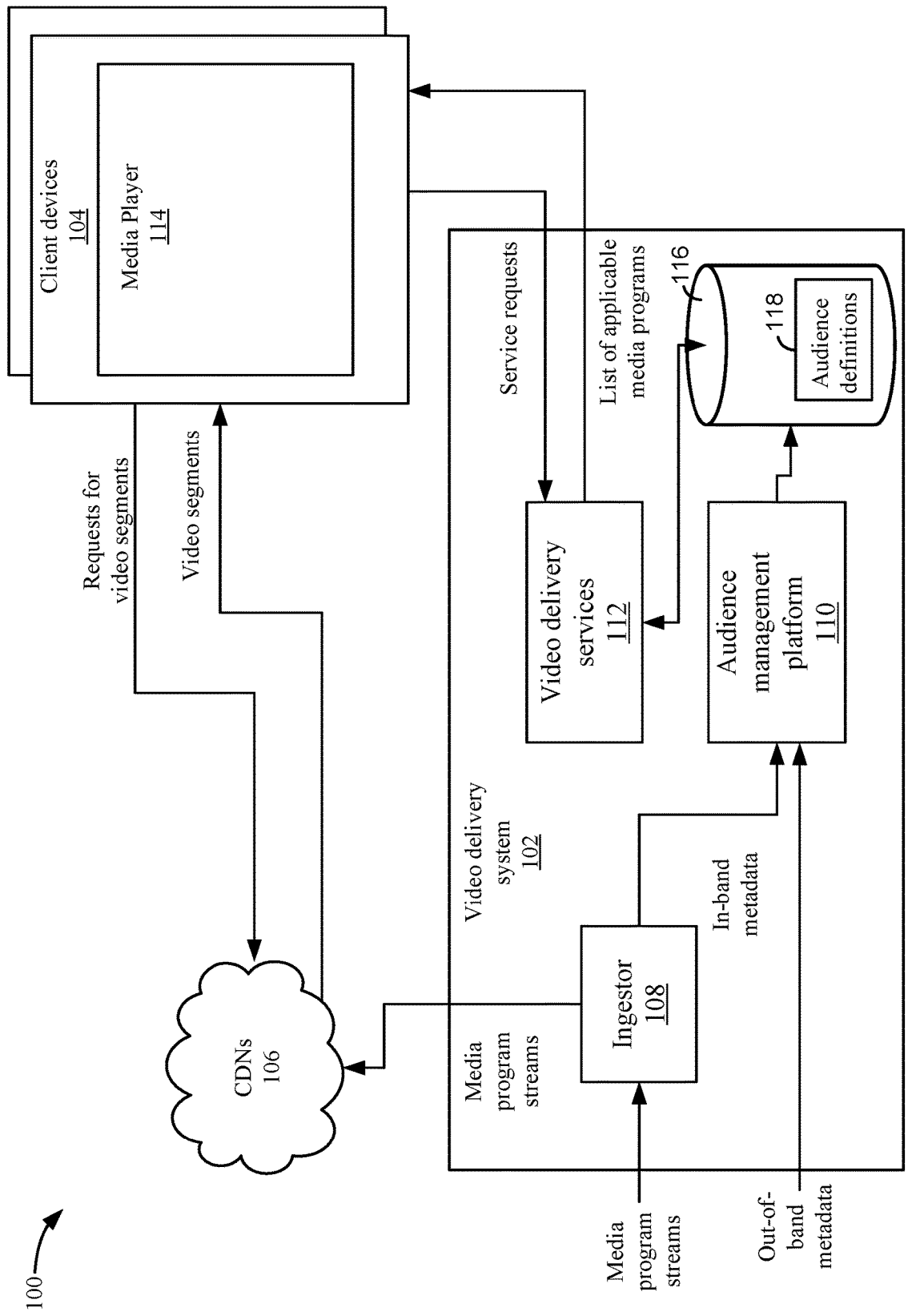
FIG. 1 depicts a simplified system for providing video delivery according to some embodiments.

Described herein are techniques for a video delivery system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

A video delivery system receives data for viewing policies, such as data using the Society of Cable Telecommunications Engineers (SCTE) 224 standard, from a provider via an interface, such as an interface described in an event scheduling notification interface (ESNI) definition. The SCTE-224 data may include viewing policies for media programs being offered in live linear programming, such as in a live television service. The viewing policies define audiences for the media programs, which may be a set of restrictions that define characteristics of a user, such as location or device type. The video delivery system can parse the data to generate a linear prioritized list of one or more rules based on the viewing policies for audiences. These rules may specify audiences and actions to perform if users fall within the audiences.

The video delivery system may apply the rules per media program rather than per user as discussed in the Background. For example, the video delivery system may calculate the rules prior to a user selecting a channel to view the media program. Performing the calculation before the user selects the channel may require processing the rules in a different way than intended by the SCTE-224 standard. For example, the video delivery system can calculate the rules for the media program and review the rules to determine a first audience in the priority that has an action of sending the content stream to a user. The content stream is the stream in which a media program is sent. The video delivery system may skip over rules that do not involve actions of sending the media program to the user, such as displaying a blackout slate or recommending an alternative content stream. In general, users meeting the characteristics for receiving the blackout slate or recommending an alternative content stream should not receive the content stream. The video delivery system then uses the audiences for the skipped over rules to modify the audience for the content stream to generate an audience definition for the media program, the process of which will be described in more detail below. This audience definition is then saved with the media program.

By saving the audience definition with the media program, the video delivery system may offer services prior to a user selecting a channel to view the media program and also across many different users. For example, a user may perform a search, such as for television dramas. Using the audience definition for media programs, the video delivery system may determine a list of media programs that match the search query, but also are media programs that the user can watch. For example, the video delivery system uses the characteristics of the user and the audience definitions to determine which media programs the user can watch. Also, in another service, the video delivery system may use the audience definitions for all media programs to generate an electronic programming guide for a user that includes only media programs the user can watch. Using the audience definition, the video delivery system thus does not provide search results for media programs that the user cannot watch, such as media program that might be blacked out because of the user's geographic location. Further, the video delivery system does not need to process the rules for each user to determine whether the users can watch the media program. Avoiding having to process all the rules per user performs the services faster especially when the service is performed for multiple users rather than on a per user basis. As will be described in more detail below, the video delivery system performs calculations different from the calculations that would need to be performed in real-time on a per user basis.

FIG. 1 depicts a simplified system 100 for providing video delivery according to some embodiments. System 100 includes a video delivery system 102, client devices 104, and content delivery networks (CDNs) 106. Video delivery system 102 may manage the delivery of media programs to client devices 104 via content delivery networks 106. Video delivery system 102 receives content streams for media programs from a content provider. The content streams may include video or other content (e.g., audio). The media programs may be live or recorded. For example, live media programs may be from a live event occurring in real-time. A recorded event may be content from a television show or other content that was recorded previously. The media programs may be offered on a live linear programming schedule. Users can only view the media program when the media program is offered in the schedule on the channel.

Video delivery system 102 may receive content streams for multiple channels where a channel may be offered by a network and a video delivery service allows users of the service to request the channel using the service. For example, a user may request a stream X, which may be associated with a network, network category, or channel, using the video delivery service. At this time in the linear programming schedule, the channel may offer a specific media program. Then, video delivery system 102 provides a manifest that may include links for segments of the media program, such as 6-10 second segments. Client device 104 then uses the links to request and receive the segments from content delivery network 106. Client device 104 may then display the media program in a media player 114.

Audience management platform 110 may receive metadata for media programs being offered in the live linear programming. For example, audience management platform 110 may receive in-band and out-of-band metadata. In some embodiments, the out-of-band metadata may be received via a provider ESNI using a protocol, such as SCTE-224. The out-of-band metadata may be received via a different connection from the connection used to deliver the content streams. In-band metadata may be received with the content streams and may specify real-time data for SCTE-224, such as real-time blackout information. Although in-band and out-of-band metadata are described, the SCTE-224 metadata may be received via different ways. Also, although SCTE-224 metadata is described, it will be understood that other metadata may be used that defines viewing policies.

Audience management platform 110 may review the metadata and generate audience definitions that each may include an audience that is allowed to view a respective media program. The generation of the audience definitions will be described in more detail below. Audience management platform 110 can store audience definitions 118 for the media programs in storage 116, which may be accessible by video delivery system 102. In some embodiments, storage 116 is not located at a user's premises that is using client devices 104. Also, audience definitions 118 are associated with respective media programs and used to provide services to multiple users. For example, as described above, video delivery services 112 may use audience definitions 118 to provide services to users, such as determining a list of applicable media programs that may include only media programs that meet the characteristics of the user, for example, media programs that a user is eligible to view based on the user's location or device type.

Audience Definition Generation

Figure 2:
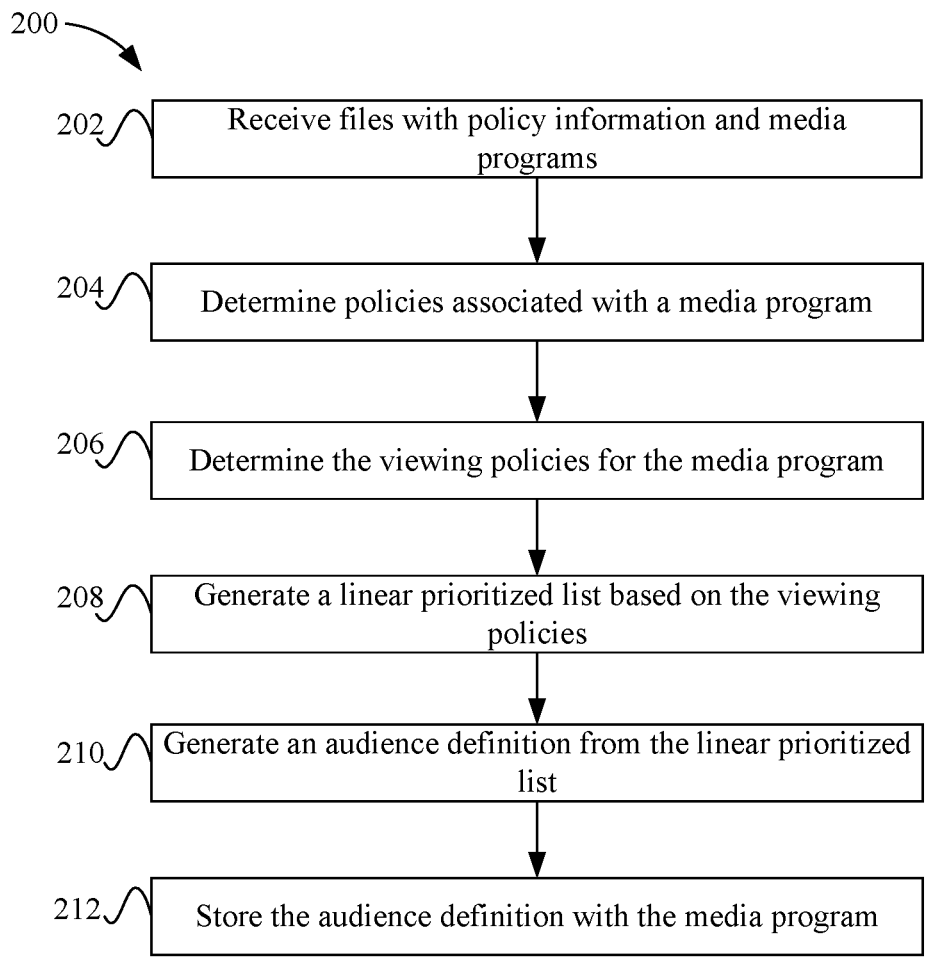
FIG. 2 depicts a simplified flowchart of a method for generating an audience definition according to some embodiments.

FIG. 2 depicts a simplified flowchart 200 of a method for generating an audience definition according to some embodiments. At 202, audience management platform 110 receives files with policy information and media programs. In some embodiments, the policy information may be SCTE-224 data. A policy defines one or more actions against a defined set of audiences. A policy may allow or restrict behaviors, presentations, or other user experiences related to rights, protections, or other rules of the referenced media programs.

After receiving the policy information, at 204, audience management platform 110 determines which policies are associated with a media program. There may be one or more policies that may be active for the media program. For example, the media program may be a show, sporting event, or other content. The media program may be identified differently in the policies, such as by name, time points that identifier the start and end point of a media program, or other identifiers.

At 206, audience management platform 110 determines the viewing policies for the media program. In some embodiments, each policy may be a collection of viewing policies, which each define an audience and one or more actions to perform for that audience. The viewing policy may be applied or removed when attributes of a user or client device 104 match any of the audiences in the viewing policy. An audience may be a set of restrictions that may define a characteristics of users. The audience may be defined in different ways, such as by geolocation, device type, or device capability. Some examples of an audience may be different granularities of location, such as in Southern California, in a location within Southern California, etc. Other examples of an audience may include a device-type, such as on a mobile device.

At 208, audience management platform 110 generates a linear prioritized list based on the viewing policies. In some embodiments, audience management platform 110 generates the priority and order of the list based on the SCTE-224 standard and the policy precedence rules described in the standard that assign a priority to viewing policies. The precedence rules are used to determine which viewing policies have priority over other viewing policies. From the precedence rules of the SCTE-224 specification, when there is a conflict with the viewing policies, the action with the highest priority is performed first. That is, if a user falls within multiple audiences, then the viewing policy with the highest priority is performed first. The linear prioritized list may include a list of audiences and corresponding actions for each audience in order of a priority.

Figure 4A:
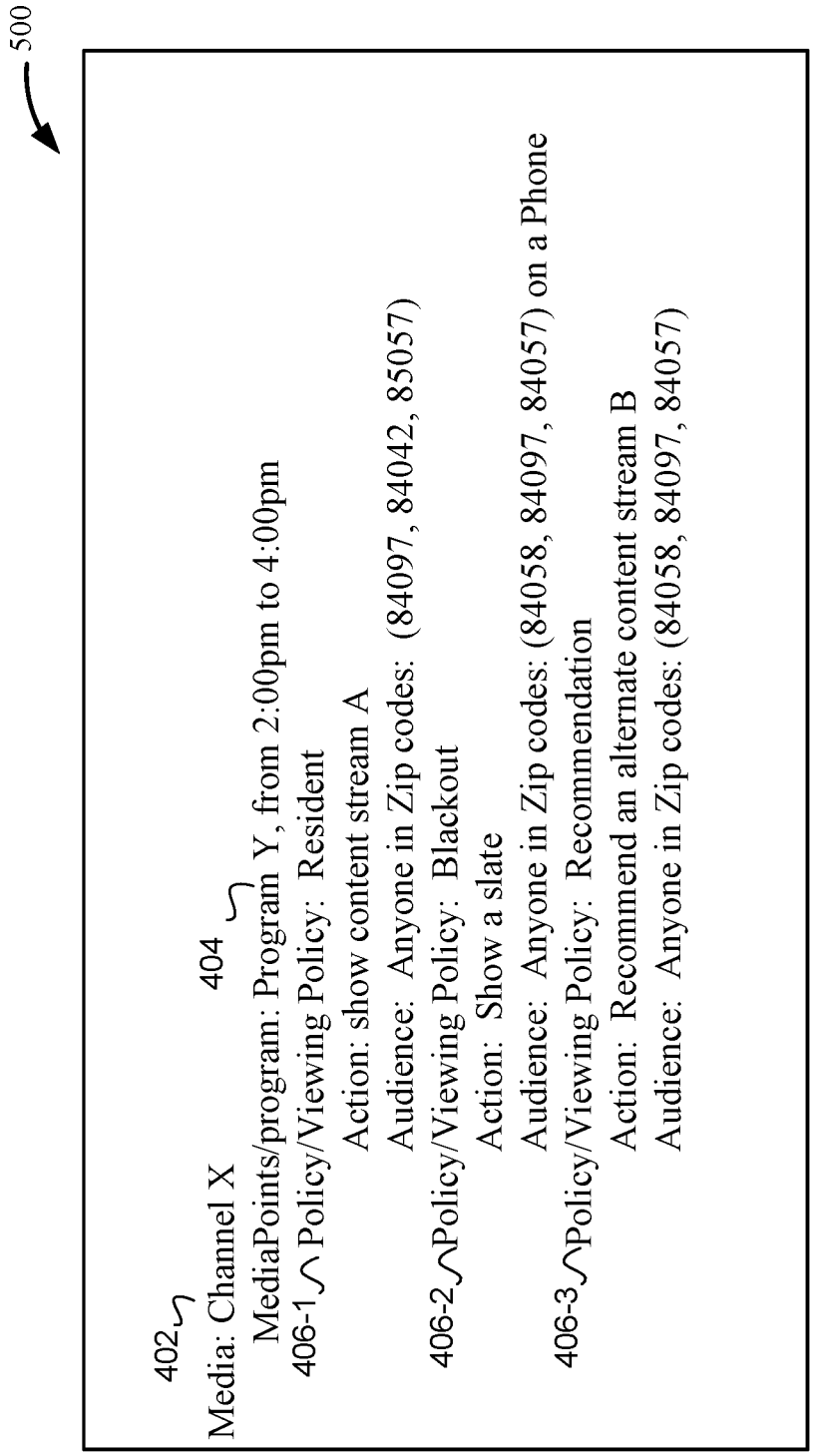
FIG. 4A shows an example of data from files received for a media program that are used to generated the linear prioritized list according to some embodiments.

FIG. 4A shows an example of data from files received for a media program that are used to generated the linear prioritized list according to some embodiments. At 402, the media is described as channel X, which may be a channel in a live linear programming schedule. At 404, a media program is described as program Y, which is aired from 2:00 to 4:00 p.m. This program may be a specific video, such as a show or movie. Then, three viewing policies 406-1 to 406-3 are shown. Each viewing policy may include an action and an audience. For example, in viewing policy 406-1 for a resident, the action is show content stream A for an audience of anyone in ZIP codes 84097, 84042, and 85057. In viewing policy 406-2, a blackout is provided with an action of show a slate for an audience of anyone in ZIP codes 84058, 84097, and 84057 that are on a phone. In viewing policy 406-3, a recommendation policy includes an action of recommend the alternative content stream B with an audience of anyone in ZIP codes 84058, 84097, and 84057. The recommendation may be an image that includes the recommendation.

Figure 4B:
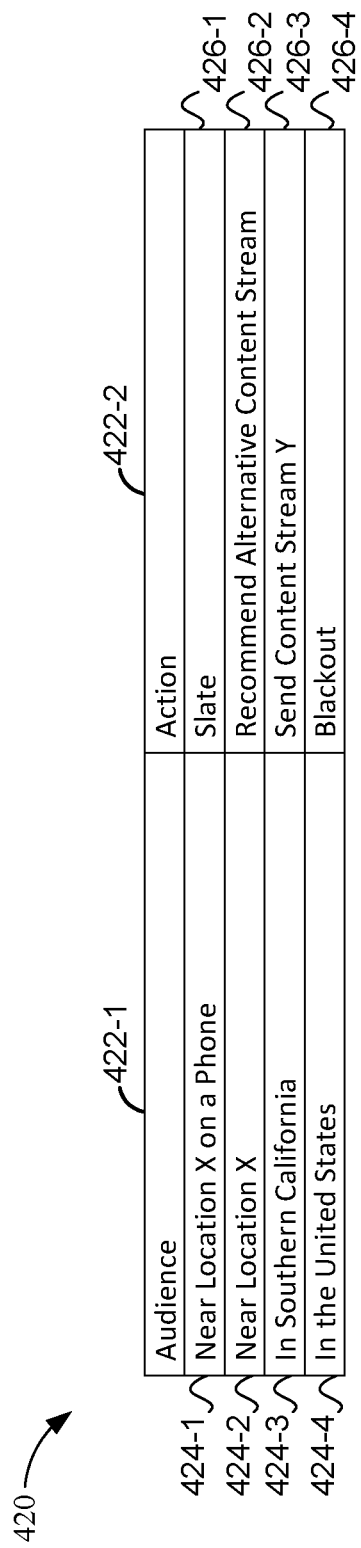
FIG. 4B shows an example of taking the viewing policies and creating a linear prioritized list according to some embodiments.

FIG. 4B shows an example of taking the viewing policies and creating a linear prioritized list according to some embodiments. Instead of going through each audience and action based on a user, audience management platform 110 goes through the audience and actions for a media program to find a correct audience for the media program. A linear prioritized list 420 includes a first column 422-1 for the audience and a second column 422-2 for respective actions for the audience. Each row in list 420 may include an audience and a respective action. In this example, the audience includes four audiences 424-1 to 424-4 and the possible actions include four actions 426-1 to 426-4. Audience management platform 110 generates the priority based on the precedence rules of SCTE-224. Actions given a higher precedence are placed higher in the list with respect to priority.

From the linear prioritized list, referring back to FIG. 2, at 210, audience management platform 110 generates an audience definition 118. Audience definition 118 may define the audience that can view the media program. As will be discussed in more detail below, the audience that is selected is a population of characteristics for users that can be applied to the media program at different times. The rules for the media program do not need to be reviewed in this case. To avoid applying the rules, at 212, audience management platform 110 stores audience definition 118 with the media program. Video delivery system 102 uses the audience definition instead of the rules to perform certain services.

Figure 3:
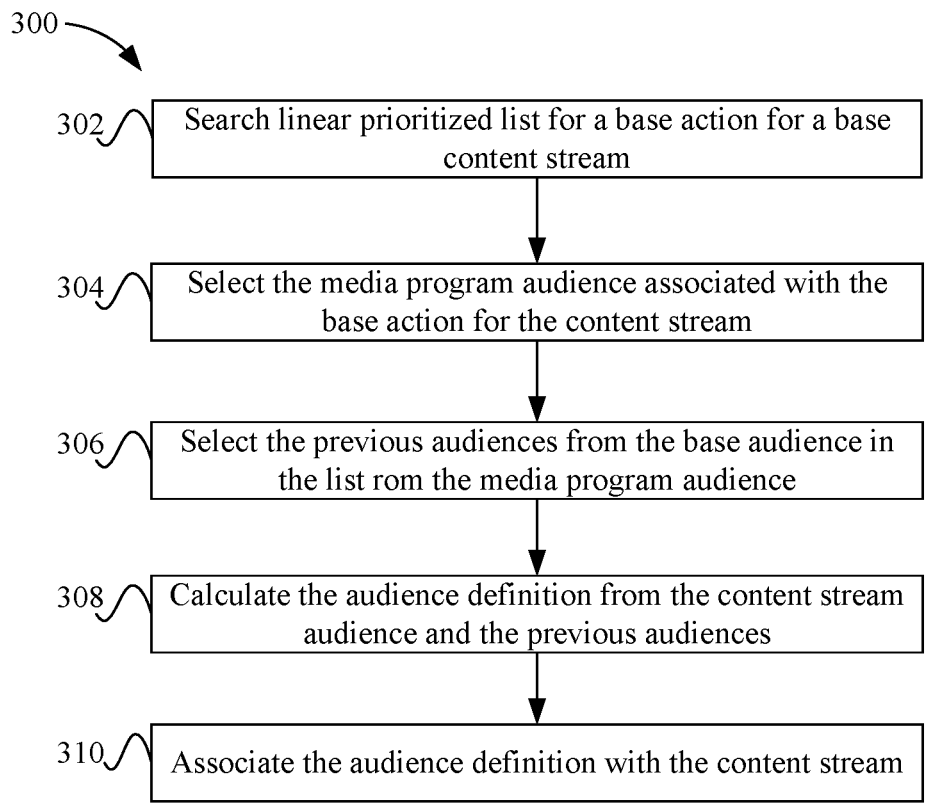
FIG. 3 depicts a simplified flowchart of a method for generating an audience definition according to some embodiments.

FIG. 3 depicts a simplified flowchart 300 of a method for generating audience definition 118 according to some embodiments. At 302, audience management platform 110 searches the linear prioritized list for a base action for a base content stream. Referring to FIG. 4B, audience management platform 110 may start from the first action at 426-1 and receives each action in the priority in order until the base content stream is determined. In this example, the action is a "slate", which may be a static image that is not a content stream but instead is an image that provides a message to a user. For example, the message may be a black screen that says: "This media program is not available in your area." The slate may be displayed when a blackout for the content stream has occurred, which means the media program is not available in that location or for a device type. Audience management platform 110 may compare the action to rules and determine that this action does not involve the base content stream. For example, the slate is not a content stream. A content stream may be a stream in which segments of the media program can be continuously requested by client device 104. In the blackout slate, only a single image is requested.

Audience management platform 110 may then move to the next action in list 420, which is "Recommend alternative content stream" at 426-2. This action may display a static image with a recommendation to view the alternative media program. Audience management platform 110 may compare the action to rules and determine that the image is not the base content stream. This action may be used when the user is in a location that is not eligible to receive the base content stream.

Audience management platform 110 then moves to the next action in list 420, which is "Send content stream Y", where Y may be a specific media program. For example, the media program Y may be a sporting event. This action sends and displays the media program Y to a client. In some embodiments, audience management platform 110 determines that this is a base content stream using rules that define which action is a base content stream. In some embodiments, the rules may be different per provider or per media program. For example, some providers may send actions in different formats. In some embodiments, the rules may determine if the action is associated with a send action, then this is the base content stream. Also, the rules may determine if the action is not associated with a blackout or a slate, then this is a base content stream. Further, a lack of an action may be treated as the base content stream.

Referring back to FIG. 3, once determining the base content stream, the search process ends and, at 304, audience management platform 110 selects the media program audience associated with the base action for the content stream. At 306, audience management platform 110 may then select the previous audiences in the list from the base audience associated with the base content stream. Referring to FIG. 4B, the base audience is "in Southern California" at 424-3. The previous audiences are the higher priority audiences in the order, which may be found at 424-1 and 424-2 in list 420. These audiences are "near location X on a phone" at 424-1 and "near location X" at 424-2. In some embodiments, the audiences that are previous and a higher priority, may be more specific audiences, but do not have to be. For example, in Southern California is the base location, near location X may be near a baseball stadium and near location X on a phone may be near the baseball stadium on a phone. The baseball stadium may be in Southern California, which is a subset of the location in Southern California, but does not have to be. Further, location X may be Northern California or some other area. It is noted that location names are used for discussion purposes, but other identifiers may be used to define the locations, such as zip codes, geographical coordinates (e.g., latitude/longitude), or other geographic descriptors.

Referring back to FIG. 3, at 308, audience management platform 110 calculates the audience definition from the base audience and the previous audiences. For example, in FIG. 4B, if the audiences at 424-1 and 424-2 are subsets of the audience at 424-3, audience management platform 110 needs to determine how to define the audience at 424-3 to not include the audiences at 424-1 and 424-2. In some embodiments, audience management platform 110 may take the intersecting set of restrictions for the base and previous audiences and remove the previous audiences from the media program audience. This provides a new audience that can be stored as audience definition 118. One process of calculating the audience definition will be described in more detail with respect to FIG. 5.

Figure 5:
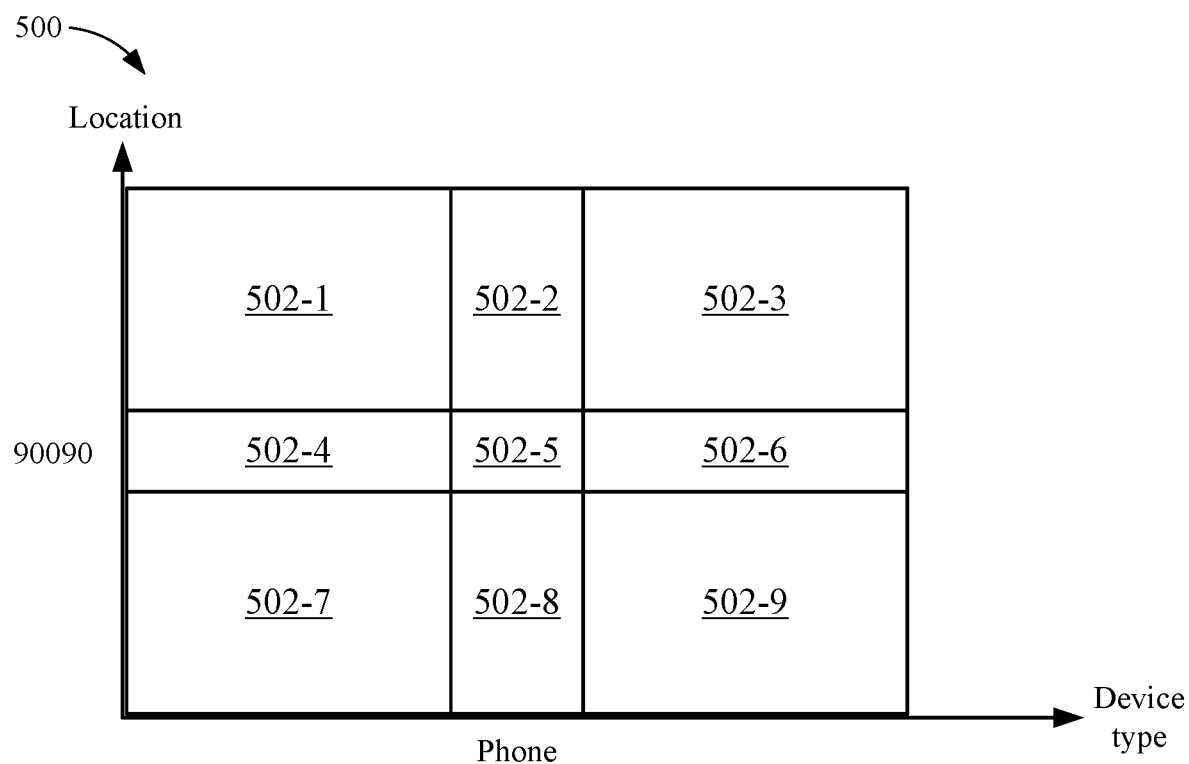
FIG. 5 shows a graph of audiences according to some embodiments.

FIG. 5 shows a graph 500 of audiences according to some embodiments. Graph 500 shows a conceptual way to illustrate different restrictions from the audiences to determine the audience definition 118. The Y axis of graph 500 shows location, and the X axis shows device type. The audiences shown at 502-1 to 502-9 may represent different restrictions. For example, each audience is defined by a set of ZIP codes for location and also by a device type. All of the audiences in 502-1 to 502-9 are for the Southern California location, which may be defined by a set of ZIP codes found in the region of Southern California. While Southern California may have different definitions, it is assumed that a definition of Southern California with respect to zip codes is defined.

Within the Southern California audience, audience management platform 110 needs to determine which audience(s) at 502-1 to 502-9 to remove. Audience management platform 110 determines intersecting restrictions that can be used to determine which audience to subtract from the content stream audience. At 502-5, a ZIP code 90090 for location X and the device type of phone intersect. This provides a restriction for the audience near location X on a phone. Also, the audience near location X includes the audience at 502-5, but also includes audiences 502-4 and 502-6. To simplify the determination of which audiences to subtract, audience management platform 110 could have subtracted all boxes associated with the ZIP code 90090 at 502-4, 502-5, and 502-6 instead of determining the intersection for the zip code 90090 and device type of phone at 502-5 for the audience at 424-1. That is, determining the audiences for near location X includes determining the audience for near location X on a phone, which means audience management platform 110 may skip the calculation for the audience defined by near location X on a phone.

The above optimization may be generally described by the following process. Audience management platform 110 may subtract each audience individually. Then, audience management platform 110 determines which limitations have been reduced to zero items. For example, if any of the limitations subtract all of the possible items in the Southern California audience, this results in zero items.

Then, audience management platform 110 determines which limitations to subtract individually that have non-zero items. If there is only one limitation that has non-zero items, then audience management platform 110 uses this audience to subtract from the content stream audience. However, if there are multiple audiences that have non-zero items remaining, then audience management platform 110 may select one of the audiences arbitrarily. For example, the phone audiences are represented by boxes 502-2, 502-5, and 502-8 and the zip code 90090 audiences are represented by boxes 502-4, 502-5, and 502-6. If boxes 502-2 and 502-8 have zero items in it, then audience management platform 110 can select all phone audiences and have the correct audience definition because there are no items in boxes 502-2 and 502-8. Similarly, if boxes 502-4 and 502-6 have zero items in it, then audience management platform 110 can select all 90090 audiences and have the correct audience definition because there are no items in boxes 502-4 and 502-6. By selecting only one limitation for the audience, audience management platform 110 can select the audience definition faster because using only one limitation is faster than using a multi-limitation restriction, which may take longer or not be enabled. If both audiences for the zip code and phone do not have non-zero items in boxes outside of box 502-5, then may select one of the audiences arbitrarily. This may be because picking one of the audiences is sufficient to subtract enough of the audience from the content stream audience; however, there may be some users that are restricted access they may be normally allowed access.

In the end, audience management platform 110 may select the audiences represented by boxes 502-1, 502-2, 502-3, 502-7, 502-8, and 502-9 as audience definition 118. These boxes represent in Southern California but not near location 90090 or not near location 90090 and on a phone. In some examples, the audiences represented by boxes 502-1, 502-2, 502-3, 502-7, 502-8, and 502-9 may include restrictions, such as zip codes. The restrictions may not include rules that need to be evaluated to determine the audience. Rather, the zip codes define the location of the audience. Referring to FIG. 3, at 310, audience management platform 110 then associates audience definition 118 with the content stream. Accordingly, audience management platform 110 can store audience definition 118 with the content stream instead of the full set of rules from the viewing policies. It should be noted that audience definition 118 is associated with the content stream and may not have to be stored with the actual video of the content stream. Rather, an identifier of the content stream is associated with audience definition 118.

Audience Management Platform

Figure 6:
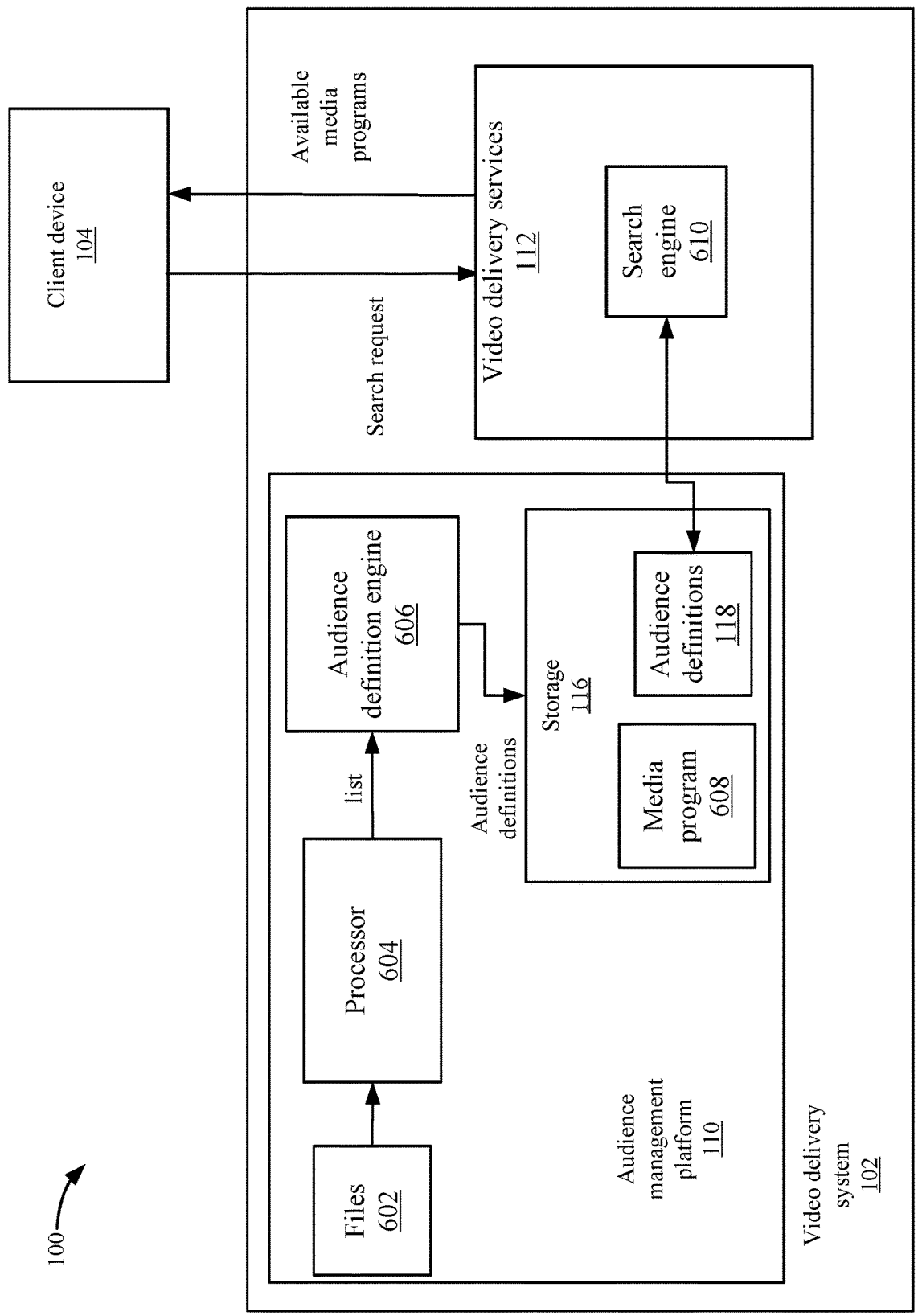
FIG. 6 depicts a more detailed example of an audience management platform and video delivery services according to some embodiments.

FIG. 6 depicts a more detailed example of audience management platform 110 and video delivery services 112 according to some embodiments. Audience management platform 110 may receive files 602 from a provider via an ENSI using the SCTE-224 standard. The files may be in a format specified by SCTE-224.

A processor 604 may determine the policy that include the viewing policies from file 602. Processor 604 then can generate the linear prioritized list from the viewing policies. Once the list is generated, audience definition engine 606 reviews the list to determine audience definition 118. In one example, audience definition engine 606 may review the actions in the priority order starting from the highest priority and save the audiences as previous audiences when the action does not qualify as the base content stream. For example, audience definition engine 606 may review actions and eliminate actions, such as a blackout or a link to an alternative content stream, until the base content stream is encountered.

Audience definition engine 606 then calculates audience definition 118 using the previous audiences that were stored while reviewing the actions. This eliminates a step of reviewing the rules again. Then, audience definition engine 606 stores audience definition 118 with content stream 608 in storage 116. This may be a table that lists content stream identifiers with audience definitions 118 for multiple media programs.

Video Delivery Services

Video delivery services 112 may then use audience definitions 118 to perform services for video delivery system 102. In some examples, a search engine 610 in FIG. 6 may receive search requests from client devices 104 for media programs. Search engine 610 may then determine characteristics for client device 104, such as the location of client device 104 and the device type of client 104. Then, search engine 610 uses these characteristics to search audience definitions 118. For example, search engine 610 may find all media programs 608 that meet the audience definition 118 that is associated with respective media programs 608. In some examples, if the user is within a zip code of 90005, then any media programs that have an audience definition 118 that includes that zip code are selected. Search engine may perform a query with the zip code that returns the media program identifiers that have entries that include the zip code. Then, search engine 610 can provide the available media programs to client device 104.

Figure 7:
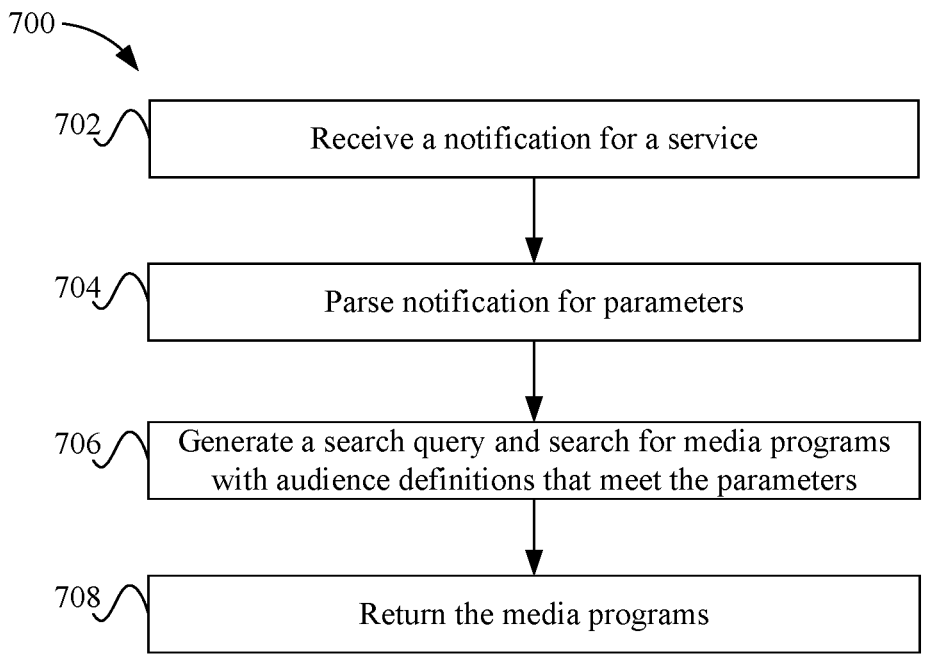
FIG. 7 depicts a simplified flowchart of a method for processing a search query according to some embodiments.

FIG. 7 depicts a simplified flowchart 700 of a method for processing a search query according to some embodiments. At 702, audience management platform 110 receives a notification for performing a service. It should be noted that the notification may be received from client 104 in some cases, but does not need to be received from a client. Rather, video delivery system 102 may be determining media programs to suggest to a client 104 and performs the search without prompting from a user of client device 104.

At 704, search engine 610 parses the notification for parameters. For example, the parameters may include characteristics for the user and/or client device 104. Examples of the characteristics include a location of the user, such as a home location or current location, and/or a device type.

At 706, search engine 610 generates a search query and searches for media programs with audience definitions that meet the parameters. For example, media programs that have audience definitions that apply to the user are determined. In some cases, audience definitions 118 may be positive or negative. A positive audience definition may be "within ZIP code 90005". A negative audience definition may be "not within ZIP code 90090". Search engine 610 is able to apply the parameters to audience definitions to determine which media programs meet the parameters.

Then, at 708, search engine 610 returns the media programs. In one example, the user may be within Southern California but not within ZIP code 90090. For example, the user may be within ZIP code 90005, which is in the definition of zip codes for Southern California. Thus, media programs that include audience definitions that include ZIP code 90005 may be determined. In some embodiments, the audience definition may have a list of zip codes that are included in the definition of Southern California. Additionally, if audience definition 118 have an additional limitation of device type, then search engine 610 may eliminate media programs that should not be viewed on by a device type, such as a phone.

In determining the available media programs, search engine 610 did not go through the prioritized linear list of audiences in order (or at all) to determine which action to perform. Rather, search engine 610 uses the restrictions for audience definition 118 to determine the available media programs. This allows search engine 610 to more quickly determine the content streams 608 that are available to client device 104 compared to reviewing all the rules for each of the media programs. This process is useful because in some services, client device 104 is not requesting to watch a channel that is playing a single media program. However, in a search request for possible media programs to view that is not specifying a specific media program or channel, search engine 610 can quickly determine media programs that have audience definitions 118 that are applicable via a query using a zip code or other user characteristics. Because the precise audience has been pre-calculated, search engine 610 can calculate and provide the search results much faster. Search engine 610 may not care if a slate or recommended alternative content stream should be provided to the user as an action for the search request. Rather, search engine 610 wants to determine if the media program associated with audience definition 118 is available for the user to view.

System

Figure 8:
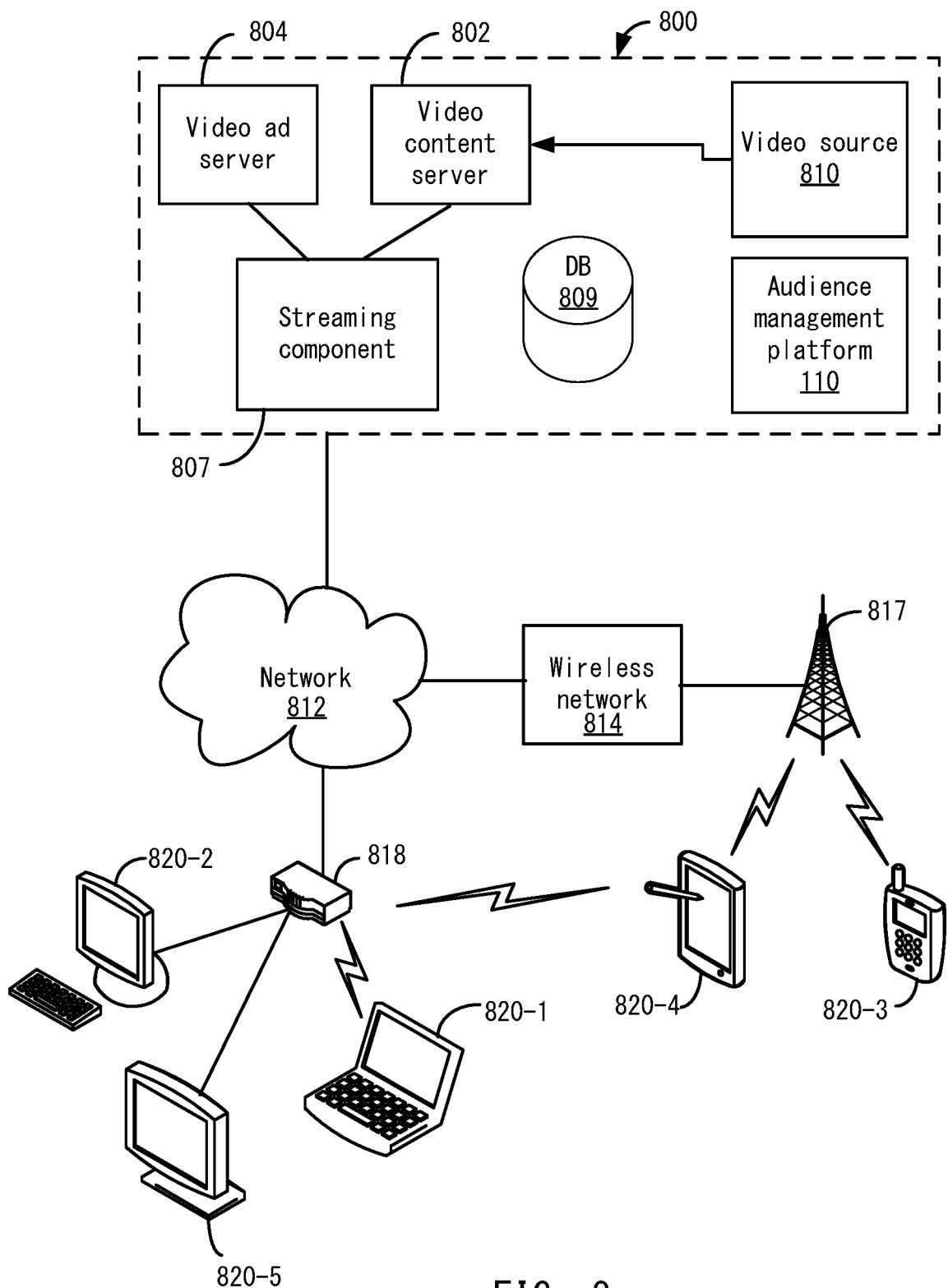
FIG. 8 depicts a video streaming system in communication with multiple client devices via one or more communication networks according to one embodiment.

Features and aspects as disclosed herein may be implemented in conjunction with a video streaming system 800 in communication with multiple client devices via one or more communication networks as shown in FIG. 8. Aspects of the video streaming system 800 are described merely to provide an example of an application for enabling distribution and delivery of media program prepared according to the present disclosure. It should be appreciated that the present technology is not limited to streaming video applications, and may be adapted for other applications and delivery mechanisms.

In one embodiment, a media program provider may include a library of media programs. For example, the media programs may be aggregated and provided through a site (e.g., Website), application, or browser. A user can access the media program provider's site or application and request media programs. The user may be limited to requesting only media programs offered by the media program provider.

In system 800, video data may be obtained from one or more sources for example, from a video source 810, for use as input to a video media program server 802. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other media program produced as primary media program of interest to consumers. The video data may also include audio or only audio may be used.

The video streaming system 800 may include one or more computer servers or modules 802, 804, and/or 807 distributed over one or more computers. Each server 802, 804, 807 may include, or may be operatively coupled to, one or more data stores 809, for example databases, indexes, files, or other data structures. A video content server 802 may access a data store (not shown) of various video segments. The video content server 802 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 804 may access a data store of relatively short videos (e.g., 10 second, 30 second, or 60 second video advertisements) configured as advertising for a particular advertiser or message. The advertising may be provided for an advertiser in exchange for payment of some kind, or may comprise a promotional message for the system 800, a public service message, or some other information. The video advertising server 804 may serve the video advertising segments as directed by a user interface controller (not shown).

The video streaming system 800 also may include audience definition 118.

The video streaming system 800 may further include an integration and streaming component 807 that integrates video content and video advertising into a streaming video segment. For example, streaming component 807 may be a content server or streaming media server. A controller (not shown) may determine the selection or configuration of advertising in the streaming video based on any suitable algorithm or process. The video streaming system 800 may include other modules or units not depicted in FIG. 8, for example administrative servers, commerce servers, network infrastructure, advertising selection engines, and so forth.

The video streaming system 800 may connect to a data communication network 812. A data communication network 812 may comprise a local area network (LAN), a wide area network (WAN), for example, the Internet, a telephone network, a wireless cellular telecommunications network (WCS) 814, or some combination of these or similar networks.

One or more client devices 820 may be in communication with the video streaming system 800, via the data communication network 812 and/or other network 814. Such client devices may include, for example, one or more laptop computers 820-1, desktop computers 820-2, "smart" mobile phones 820-3, tablet devices 820-4, network-enabled televisions 820-5, game consoles, streaming sticks, set-top-boxes or combinations thereof, via a router 818 for a LAN, via a base station 817 for a wireless telephony network 814, or via some other connection. In operation, such client devices 820 may send and receive data or instructions to the system 800, in response to user input received from user input devices or other input. In response, the system 800 may serve video segments and metadata from the data store 809 responsive to selection of media programs to the client devices 820. Client devices 820 may output the video content from the streaming video segment in a media player using a display screen, projector, or other video output device, and receive user input for interacting with the video content.

Distribution of audio-video data may be implemented from streaming component 807 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single single provider delivering a stream of data to a set of end users. High bandwidths and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 807 may communicate with client device 820 using control messages and data messages to adjust to changing network conditions as the video is played. These control messages can include commands for enabling control functions such as fast forward, fast reverse, pausing, or seeking to a particular part of the file at the client.

Since streaming component 807 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched, (3) use transmission bandwidth more efficiently, since only the amount of data required to support the viewing experience is transmitted, and (4) the video file is not stored in the viewer's computer, but discarded by the media player, thus allowing more control over the content.

Streaming component 807 may use TCP-based protocols, such as HTTP and Real Time Messaging Protocol (RTMP). Streaming component 807 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Another protocol used for streaming is hypertext transfer protocol (HTTP) live streaming (HLS) or Dynamic Adaptive Streaming over HTTP (DASH). The HLS or DASH protocol delivers video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, using a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 9:
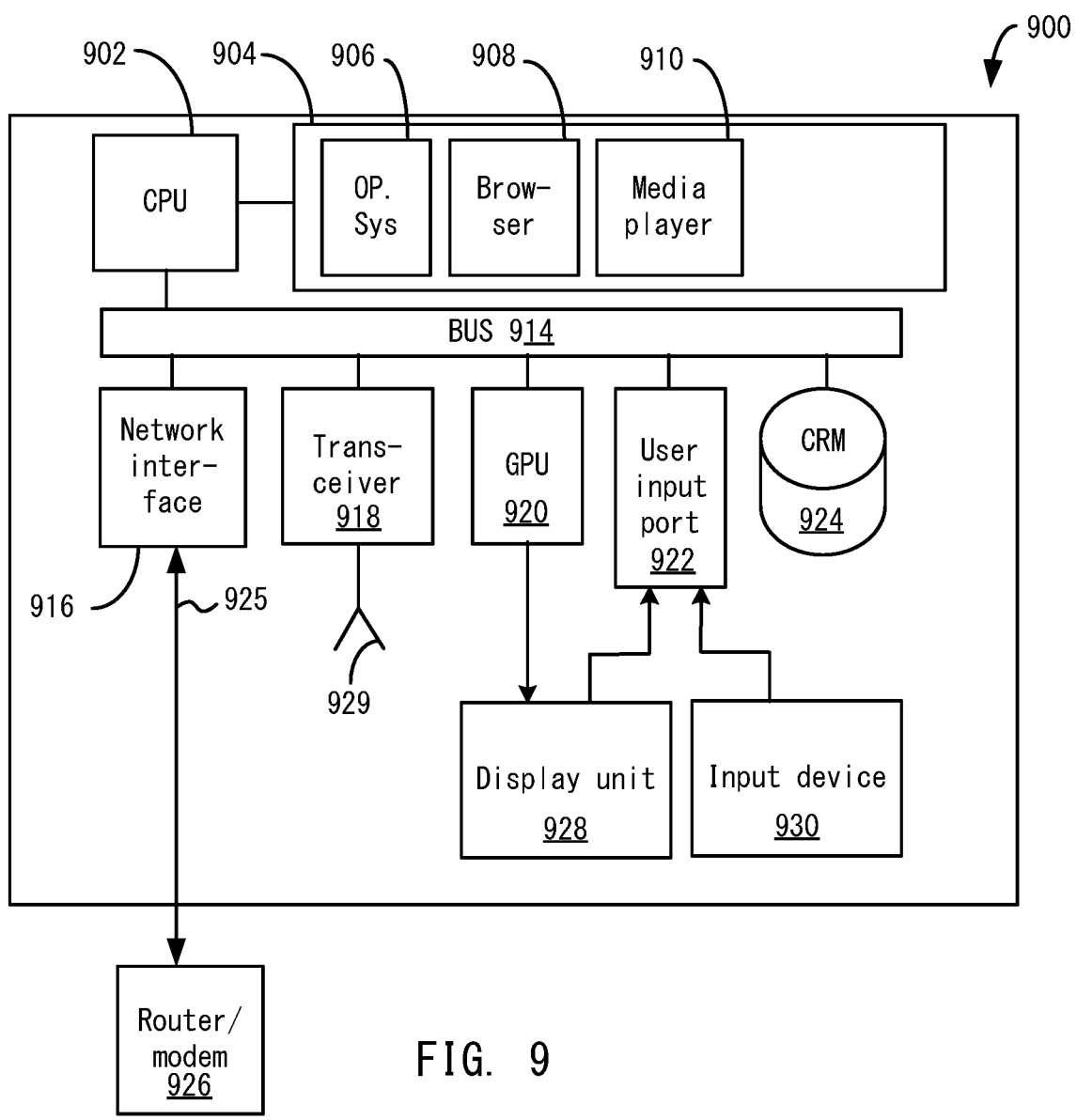
FIG. 9 depicts a diagrammatic view of an apparatus for viewing video content and advertisements.

Referring to FIG. 9, a diagrammatic view of an apparatus 900 for viewing video content and advertisements is illustrated. In selected embodiments, the apparatus 900 may include a processor (CPU) 902 operatively coupled to a processor memory 904, which holds binary-coded functional modules for execution by the processor 902. Such functional modules may include an operating system 906 for handling system functions such as input/output and memory access, a browser 908 to display web pages, and media player 910 for playing video. The memory 904 may hold additional modules not shown in FIG. 9, for example modules for performing other operations described elsewhere herein.

A bus 914 or other communication component may support communication of information within the apparatus 900. The processor 902 may be a specialized or dedicated microprocessor configured to perform particular tasks in accordance with the features and aspects disclosed herein by executing machine-readable software code defining the particular tasks. Processor memory 904 (e.g., random access memory (RAM) or other dynamic storage device) may be connected to the bus 914 or directly to the processor 902, and store information and instructions to be executed by a processor 902. The memory 904 may also store temporary variables or other intermediate information during execution of such instructions.

A computer-readable medium (CRM) in a storage device 924 may be connected to the bus 914 and store static information and instructions for the processor 902; for example, the storage device (CRM) 924 may store the modules 906, 908, and 910 when the apparatus 900 is powered off, from which the modules may be loaded into the processor memory 904 when the apparatus 900 is powered up. The storage device 924 may include a non-transitory computer-readable storage medium holding information, instructions, or some combination thereof, for example instructions that when executed by the processor 902, cause the apparatus 900 to be configured to perform one or more operations of a method as described herein.

A communication interface 916 may also be connected to the bus 914. The communication interface 916 may provide or support two-way data communication between the apparatus 900 and one or more external devices, e.g., the streaming system 800, optionally via a router/modem 926 and a wired or wireless connection. In the alternative, or in addition, the apparatus 900 may include a transceiver 918 connected to an antenna 929, through which the apparatus 900 may communicate wirelessly with a base station for a wireless communication system or with the router/modem 926. In the alternative, the apparatus 900 may communicate with a video streaming system 800 via a local area network, virtual private network, or other network. In another alternative, the apparatus 900 may be incorporated as a module or component of the system 800 and communicate with other components via the bus 914 or by some other modality.

The apparatus 900 may be connected (e.g., via the bus 914 and graphics processing unit 920) to a display unit 928. A display 928 may include any suitable configuration for displaying information to an operator of the apparatus 900. For example, a display 928 may include or utilize a liquid crystal display (LCD), touchscreen LCD (e.g., capacitive display), light emitting diode (LED) display, projector, or other display device to present information to a user of the apparatus 900 in a visual display.

One or more input devices 930 (e.g., an alphanumeric keyboard, microphone, keypad, remote controller, game controller, camera or camera array) may be connected to the bus 914 via a user input port 922 to communicate information and commands to the apparatus 900. In selected embodiments, an input device 930 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 928, for example using a touch sensitive screen. A cursor control device may communicate direction information and command selections to the processor 902 and control cursor movement on the display 928. A cursor control device may have two or more degrees of freedom, for example allowing the device to specify cursor positions in a plane or three-dimensional space.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
   receiving, by a computing device, one or more viewing policies for a media program being offered via live linear programming, the one or more viewing policies being in a format to be applied per user;
   transforming, by the computing device, the one or more viewing policies to a linear prioritized list of audience locations and respective actions to perform on a per user basis for presentation via the live linear programming, wherein the linear prioritized list organizes the one or more viewing policies where a higher priority viewing policy is performed when a user falls within multiple audience locations for multiple viewing policies and the linear prioritized list of audience locations organizes audience locations with a higher priority as subsets of audience locations with a lower priority;
   analyzing, by the computing device, the actions to determine a base action associated with sending a base content stream for the media program, the base action being lower in priority than other previous actions in the linear prioritized list that do not send the base content stream;
   selecting, by the computing device, a content stream audience location associated with the base content stream and one or more previous audience locations associated with the previous actions that have a higher priority in the linear prioritized list than the content stream audience location, the one or more previous audience locations being a subset of the content stream audience location and being higher in priority than the content stream audience location;
   removing, by the computing device, the one or more previous audience locations from the content stream audience location to generate a new audience location from within the content stream location that is different from audience locations in the linear prioritized list of audience locations; and
   storing, by the computing device, the new audience location in association with the media program, wherein the new audience location is used to determine whether users may view the media program based on characteristics of the users in place of the one or more viewing policies via the live linear programming.

2. The method of claim 1, further comprising:
   generating a programming guide for a plurality of users using the new audience location for the media program.

3. The method of claim 2, wherein generating the programming guide comprises:
comparing the new audience location for the media program to characteristics for each of the plurality of users; and
including the media program in the programming guide if the new audience location meets the characteristics for each of the plurality of users.

4. The method of claim 3, wherein the generating of the programming guide does not review the audience locations in the linear prioritized list to determine whether to include the media program in the electronic programming guide.

5. The method of claim 1, wherein the content stream audience location defines characteristics for an audience that may view the media program.

6. The method of claim 5, wherein the one or more previous audience locations define characteristics for audience locations that are not allowed to watch the media program.

7. The method of claim 1, wherein the new audience location is different from the content stream audience location.

8. The method of claim 1, wherein the one or more previous actions are not sending the base content stream.

9. The method of claim 8, wherein one of the one or more previous actions comprises displaying an image.

10. The method of claim 9, wherein the image comprises a slate displaying text or a message recommending another content stream for another media program.

11. The method of claim 1, wherein selecting the content stream audience location comprises:
reviewing the actions in the linear prioritized list from a highest priority to a lowest priority until the base content stream is encountered.

12. The method of claim 11, wherein reviewing the actions comprises:
comparing an action to a type of action to determine whether the action is associated with the base content stream.

13. The method of claim 1, further comprising:
receiving a notification for a user, the user associated with one or more characteristics;
searching for media programs that include new audience locations that meet the one or more characteristics; and
returning the media programs that include the new audience locations that meet the one or more characteristics.

14. The method of claim 13, wherein the notification is a search query from the user.

15. The method of claim 1, wherein one or more restrictions for the new audience location define the removal of the one or more previous audience locations from the content stream audience location based on the at least one intersecting restriction between the one or more previous audience locations from the content stream audience location.

16. The method of claim 1, wherein removing the one or more previous audience locations comprises:
determining intersecting audience locations between the base content audience and the one or more previous audience locations; and
removing the intersecting audience locations from the content stream audience location.

17. The method of claim 1, wherein all of the other previous actions do not send the media program during a time the media program is offered.

18. A non-transitory computer-readable storage medium containing instructions, that when executed, control a computer system to be configured for:
receiving one or more viewing policies for a media program being offered via live linear programming, the one or more viewing policies being in a format to be applied per user;
transforming the one or more viewing policies to a linear prioritized list of audience locations and respective actions to perform on a per user basis for presentation via the live linear programming, wherein the linear prioritized list organizes the one or more viewing policies where a higher priority viewing policy is performed when a user falls within multiple audience locations for multiple viewing policies and the linear prioritized list of audience locations organizes audience locations with a higher priority as subsets of audience locations with a lower priority;
analyzing the actions to determine a base action associated with sending a base content stream for the media program, the base action being lower in priority than other previous actions in the linear prioritized list that do not send the base content stream;
selecting a content stream audience location associated with the base content stream and one or more previous audience locations associated with the previous actions that have a higher priority in the linear prioritized list than the content stream audience location, the one or more previous audience locations being a subset of the content stream audience location and being higher in priority than the content stream audience location;
removing the one or more previous audience locations from the content stream audience location to generate a new audience from within the content stream location that is different from audience locations in the linear prioritized list of audience locations; and
storing the new audience location in association with the media program, wherein the new audience location is used to determine whether users may view the media program based on characteristics of the users in place of the one or more viewing policies via the live linear programming.

19. The non-transitory computer-readable storage medium of claim 18, wherein the content stream audience location defines characteristics for an audience that is allowed to view the media program.

20. An apparatus comprising:
one or more computer processors; and
a non-transitory computer-readable storage medium comprising instructions, that when executed, control the one or more computer processors to be configured for:
receiving one or more viewing policies for a media program being offered via live linear programming, the one or more viewing policies being in a format to be applied per user;
transforming the one or more viewing policies to a linear prioritized list of audience locations and respective actions to perform on a per user basis for presentation via the live linear programming, wherein the linear prioritized list organizes the one or more viewing policies where a higher priority viewing policy is performed when a user falls within multiple audience locations for multiple viewing policies and the linear prioritized list of audience locations organizes audience locations with a higher priority as subsets of audience locations with a lower priority;
analyzing the actions to determine a base action associated with sending a base content stream for the media program, the base action being lower in priority than other previous actions in the linear prioritized list that do not send the base content stream;

selecting a content stream audience location associated with the base content stream and one or more previous audience locations associated with the previous actions that have a higher priority in the linear prioritized list than the content stream audience location, the one or more previous audience locations being a subset of the content stream audience location and being higher in priority than the content stream audience location;

removing the one or more previous audience locations from the content stream audience location to generate a new audience location from within the content stream location that is different from audience locations in the linear prioritized list of audience locations; and storing the new audience location in association with the media program, wherein the new audience location is used to determine whether users may view the media program based on characteristics of the users in place of the one or more viewing policies via the live linear programming.

\* \* \* \* \*